United States Patent
Palm

[11] Patent Number: 5,601,875
[45] Date of Patent: Feb. 11, 1997

[54] METHOD OF CRUSHING AND GRINDING

[75] Inventor: Carl-Olof Palm, Turku, Finland

[73] Assignee: Partek Concrete Ltd., Helsinki, Finland

[21] Appl. No.: 193,208
[22] PCT Filed: Aug. 15, 1991
[86] PCT No.: PCT/FI91/00255
    § 371 Date: Feb. 15, 1994
    § 102(e) Date: Feb. 15, 1994
[87] PCT Pub. No.: WO93/03832
    PCT Pub. Date: Mar. 4, 1993
[51] Int. Cl.⁶ ................ B05D 7/00; B02C 1/00
[52] U.S. Cl. ............ 427/221; 427/212; 427/215; 241/15; 241/38; 241/39; 241/DIG. 4
[58] Field of Search ................ 427/212, 215, 427/221; 241/15, 38, 39, DIG. 14; 118/608

[56] References Cited

U.S. PATENT DOCUMENTS

| | | | |
|---|---|---|---|
| 3,491,953 | 1/1970 | Stephanoff | 241/39 |
| 3,675,858 | 7/1972 | Stephanoff | 241/39 |
| 3,802,909 | 4/1974 | Rockett et al. | 427/214 |
| 3,937,405 | 2/1976 | Stephanoff | 241/39 |

FOREIGN PATENT DOCUMENTS

| | | |
|---|---|---|
| 104778 | 6/1966 | Denmark . |
| 275156 | 7/1988 | European Pat. Off. . |
| 52286 | 5/1977 | Finland . |
| 82-4246 | 6/1983 | Finland . |
| 193399 | 12/1907 | Germany . |
| 635899 | 9/1936 | Germany . |
| 2656531 | 6/1978 | Germany . |
| 461214 | 4/1989 | Sweden . |

OTHER PUBLICATIONS

Derwent Abstract No. 88–188 727/27, Abstract of SU–1 357 383.
Derwent Abstract No. 88–41 164/06, Abstract of SU–1 318 570.
Derwent Abstract No. 87–127 407/18, Abstract of SU–1 255 605.

Primary Examiner—Shrive Beck
Assistant Examiner—David M. Maiorana
Attorney, Agent, or Firm—Scully, Scott, Murphy & Presser

[57] ABSTRACT

The invention relates to a method of effecting a physico-chemical reaction, in which method a crystalline or amorphous substance is crushed or ground. In the method according to the invention, as soon as a new fractured surface is formed, it is brought into immediate contact with an environment V1 the physico-chemical property of which is so selected that a firm bond or compound is formed between the fractured surface and the molecules of the environment, at least one molecule of said bond or compound being adapted to its purpose for the further treatment of the crushed or ground material in another environment V2, whereby the physico-chemical property of the environment V1 is further so selected that components disadvantageous in view of the further treatment of the crushed or ground material are prevented from getting to the fractured surface.

8 Claims, No Drawings

METHOD OF CRUSHING AND GRINDING

The invention relates to a method of effecting a physico-chemical reaction, in which method a crystalline or amorphous material A is crushed or ground.

In almost all materials, the surface is a very important part of the material. It may even be said that the rest of the material serves as a mere supporting structure for the surface. Typical examples are powders and fibres in which the strength/mass increases continuously as the surface area of the fibre increases, that is, its diameter decreases.

In ceramic and other materials, small grain size is of the greatest importance, that is, a high surface area/mass unit.

In solid substances, all chemical reactions and physical adhesions always occur on the surface.

Therefore various grinding techniques have been developed, which aim at increasingly small particle sizes, that is, greater surface areas/mass unit.

Surfaces have a great number of properties all of which are not necessarily positive or desired simultaneously in view of the intended use.

The most usual formation of coating occurring in material treatment takes place spontaneously, even in such a way that it is difficult to prevent. This usually takes place as molecules present in air, especially oxygen, settle on a newly formed surface in a layer of a few molecules. In a way, the surface is contaminated.

In this way the special properties of all surfaces change nearly automatically as they are modified by oxygen molecules, and the properties of all surfaces approach each other. This takes place especially in most grinding operations, which are carried out in the atmosphere according to a prevailing practice.

Contaminations caused by the molecules of air, "coatings", adhere so firmly to the surfaces that the removal of adsorbed air from a surface formed in grinding requires prolonged bombing with an electron beam even in a vacuum.

It is known that newly formed surfaces are more active for reactions typical of all surfaces than "old surfaces". This phenomenon can be explained in many ways, which can be fitted in two main categories.

1) The surface of fracture contains free unterminated valences;
2) A gas layer from the air has not yet settled on the surface to form "an insulation", contamination.

Chemical terminology knows a concept in statu nascendi, which means "in the state of being born", whereby it is possible to effect a reaction, adsorption, etc. more rapidly and efficiently than without this situation. This is the same phenomenon as represented by the above two categories.

The present invention concerns especially grinding and treatment of material in connection with grinding for a subsequent process step.

On grinding crystalline, amorphous, e.g. glass-like material which is brittle and hard, that is, grindable, the grinding is only an intermediate step for an intended subsequent use of the material.

It has been known for a long time to grind inflammable powders in a protective gas due to the risk of explosion, for instance. The purpose of the protective gas is only to eliminate explosion, cf. U.S. Pat. No. 3,937,405.

The object of the invention is to provide a new method which prevents the formation of a disadvantageous transition zone between the material to be ground and the coating material or matrix material.

The method of the invention is characterized in that as soon as a new fractured surface is formed, it is brought into immediate contact with an environment V1 the physico-chemical property of which is so selected that a firm bond or compound is formed between the fractured surface and the molecules of the environment, at least one molecule of said bond or compound being adapted to its purpose for the further treatment of the crushed or ground material in another environment V2, whereby the physico-chemical property of the environment V1 is further so selected that components disadvantageous in view of the further treatment of the crushed or ground material are prevented from getting to the fractured surface.

The invention is also concerned with a product produced by the method of the invention. In one preferred embodiment the method of the present invention is characterized in that the bond or compound to be formed is compatible with a material B present in the other environment V2 and intended to be applied to the fractured surfaces of the crushed or ground material in the following process step. It will be noted that material B acts as a matrix for the crushed or ground material A in this embodiment.

In another preferred embodiment the environment V1 contains at least two functional groups and the material A to be crushed or ground is reacted with at least one functional group present in environment V1, and the material B, with which the material A is brought into contact after said reaction, is reacted with at least one other or the same functional group present in environment V1.

In still another preferred embodiment the method of the present invention is characterized in that the materials A and B are crushed or ground together in the environment V1, which is reactive with either the material A or the material B or reactive with both said materials.

In yet another preferred embodiment the environment V1 or its component or their functional groups are so selected that they are bound to the material A and the material B with physical surface forces greater as compared with binding taking place when crushing and grinding in an air environment.

In still a further preferred embodiment the material A is ground in an environment containing a substance C which is reactive with a substance D formed from the material A through a chemical reaction or from the material B which is to be applied to the material A, through a chemical reaction, the substance D being formed with a component E present in the environment V1.

In yet another preferred embodiment the method of the present invention is characterized in that the environment V1 is selected such that one of its components reacts chemically with the material A and the substance C is capable of active attachment to the surface formed through the chemical reaction.

The grinding environment is a gas, a liquid or a solution. It may also be a mixture of a liquid and a solid substance in cases where air contamination is to be prevented during crushing or grinding. One example is the crushing of stone material of concrete in water-cement paste or the crushing of asphalt stone material in a bitumen component; in both cases, the weak transition zone caused by contamination is eliminated, and the bond to the surfaces of the stone material is improved. In the method of the invention, grinding is preferably massive so that a lot of new fractured surfaces are formed. The proportion of new fractured surfaces is typically 10 to 1,000 times greater than the original surface area and even more.

By means of the method of the invention, the desired material can be efficiently bound to the material to be crushed or ground. It is to be noted that, due to the nature of the process, the material to be crushed may be and preferably is large in size (in the production of concrete e.g. 10 to 100 mm), and the product to be produced need not contain the starting material in certain fractions for a good end product to be achieved, which is regarded as important e.g. in the production of concrete. As a consequence, concrete with good properties can be obtained even if it contains stone material of certain size only. In the production of concrete, another advantage of large-size starting material is that it is easy to achieve the predetermined moistness required in the production of concrete. Furthermore, the quality of the stone material to be crushed in the production of concrete may be what is usually regarded as "inferior", that is, the surface of the material contains plenty of substances which will not adhere to the water-cement paste, which is due to the fact that even when crushing stone material of this kind, a lot of new fractured surface is obtained to which the water-cement paste adheres well. It can even be assumed that the dust, which is usually found disadvantageous in crushing stone material, is an advantage in the method of the invention as it contains plenty of new fractured surface to be used in the formation of strong desired bonds.

The invention will be illustrated in the following by a few examples.

EXAMPLE 1

Wollastonite was ground in order to use it as a filling powder in polystyrene plastic. For this purpose, the grinder was evacuated to a pressure below 1 mm Hg before the material to be ground was fed into the grinding chamber, and styrene gas, which was to surround the grinding process, was introduced into the chamber at normal pressure. After grinding, the new formed surfaces had a styrene coating which was to react with a polystyrene matrix with which the ground, coated product was then brought into contact. The density of the product was 0.25% greater than that of a reference product and its tensile strength was 25% greater than that of a conventional reference product.

EXAMPLE 2

Talc was ground in order to use it as a filler in polypropylene plastic. For the purpose, the talc was introduced through a feeder space, which had been pumped empty, into a front chamber, from which it was pushed by means of a shut-off feeder into a second chamber, in which a propene gas atmosphere prevailed. From the second chamber the talc was passed into a grinding chamber to which propene was still admitted continuously. After grinding, the talc was emptied in a known manner from the grinding chamber into a tightly closed container, in which the propene gas atmosphere remains in addition to talc. From this container the talc was fed into an extruder in which it was mixed with polypropylene plastic. The bending stiffness of the product was 22% greater than that of a reference product and its density was 0.11% greater than that of the reference product.

EXAMPLE 3

Grinding is carried out while coating with substances which cannot be gasified in a normal way, whereby the grinding is carried out "wet" and the coating is carried out in ion state. In this case, however, the ions to be coated compete with the solvent for space on the newly formed fractured surface. A typical process of this kind is the grinding of a hydraulically hardening pozzolan product in lime-containing water.

EXAMPLE 4

Cement was ground in carbon dioxide gas. The surface of the cement particles was thereby saturated with carbon dioxide, and when the cement was passed together with water and filler so as to form concrete and mortar or other such typical product, the carbon dioxide reacted on the surface of cement with the lime liberated from the cement, whereby the reaction rate is increased when water is able to react with the cement surface throughout.

This embodiment is particularly advantageous when the cement is ground in carbon dioxide gas together with stone material the surface of which was similarly saturated with carbon dioxide. The density of the obtained mortar prism was 5.22% greater than that of a reference product and the bending strength under tension was 45% greater than that of the reference product. Correspondingly, it is advantageous for the same reason to grind merely stone material for concrete in a carbon dioxide environment to improve adhesion, so that a firm bond is formed, in which there is no typical so-called transition zone between the solid surface and the new crystallizing cement stone.

EXAMPLE 5

The above example, in which 5% of polyvinyl alcohol was additionally dissolved in water before grinding and the mortar prisms were cast immediately after grinding. This test gave a product in which the density was 6.2% greater than that of a reference product and the bending strength under tension was 82% greater than that of the reference product, in which no carbon dioxide nor polyvinyl alcohol was used.

In the preceding examples the grinding was carried out in such a way that the surface area of the product increased so that it was about 20 times greater than the surface area measured before grinding. In Examples 4 and 5, the stone material was ground also in connection with the grinding of the binding agent. In these examples the starting stone material was of uniform size about 30 mm in diameter and stone material of max 3 to 4 mm was obtained.

In the tests carried out, however, little if any dissolved carbon dioxide was found in the concrete mix water, which indicates that the carbon dioxide is bound to the new formed surfaces very firmly.

EXAMPLE 6

Concrete was produced by crushing stone material together with cement, water and other components. Thereby no disadvantageous contamination (air if the stone material is first crushed separately) has time to adsorb on the new crushed surfaces, which can subsequently be found to constitute a poor adhesion zone, "transition zone", but the water-cement paste is made to adhere to the very skin of the stone surfaces.

EXAMPLE 7

Stone material was crushed in a cement environment. The mass was formed into a rod without admitting air into the mass and the rod was allowed to harden in a known manner. A rod of stone material crushed in air in a known manner was also produced. When the rods were broken off, it was found that the last-mentioned rod broke, as expected, along the contact surfaces between the stone material and the water-cement paste. The first-mentioned rod, in which the stone material had been crushed in accordance with the invention, broke within the cement zone.

EXAMPLE 8

Two stone rods (drilling rods) were broken, the first one of which was broken in air and the second in water-cement paste. After breakage, water-cement paste was applied to the fractured surfaces of the first rod and the rod pieces were pressed against each other, while the pieces of the second rod were kept in the water-cement paste and pressed against each other therein. Thereafter the rods were allowed to harden. After hardening, the rods were broken again, whereby it was found that the rod which had been glued in the air broke in the zone between the stone material and the water-cement paste, whereas the rod broken and glued in the water-cement paste broke within the zone of water-cement paste.

EXAMPLE 9

Asphalt is produced by crushing stone material and a bitumen component and new surfaces are allowed to be formed in their final environment or with an advantageous component or a coupling chemical which is coupled in both directions better than without this advantageous medium. As a result, a better adhesion is achieved between the stone material and bitumen.

The technique according to the invention can be used in various technical fields and products. In addition to the preceding examples, the following are typical Grinding of the filler pigment of paper in an environment where there is wet strength resin present Production of paint or printing ink in such a way that a substantial amount of the monomer of the polymer of a binding agent is present in the grinding medium gas or liquid.

According to the invention, it is possible, and advantageous, to grind or crush material in an environment in which molecules with special affinity to the material of the subsequent process step adhere to the surface of the material, whereby the material of the subsequent process step is to be fixed to said powder to be ground. At best, this special affinity may be a chemical reaction or a physical special force created by the chemical matching or similarity of the surfaces. The main thing is that the new surfaces are not formed in an environment which causes contamination disadvantageous for later use. It is possible to apply the method of the invention by weakening the bonds or affinity between the particles of the product itself (flowability) or to another component, which in some applications is important for the further treatment of the product. For instance, the water repelling property of a substance (hydrophobia) may be desirable.

According to our tests, the fixing of a material to be ground seems to be less demanding in view of the material of the coating and the ground surface. Of course, it is of advantage if a chemical reaction, for instance, would bind part of the coating "gas" to the formed surface even in grinding; however, similar binding that takes place to a subsequent "surface of the immediate environment" surrounding the ground material is more important.

I claim:

1. A method for effecting a physico-chemical reaction in, and further processing, a crystalline or amorphous material A, the method comprising:

(a) crushing or grinding said material A thereby forming new fractured surfaces and, (b) subjecting the crushed or ground material to a following process step, said step (a) comprising grinding or crushing the material A in an environment V1 in order to provide the newly fractured surfaces with characteristics suitable for the following process step, whereby the physico-chemical property of said environment V1 is so selected that a bond or compound is formed between the fractured surfaces of material A and the molecules of the said environment V1, and the physico-chemical composition of said environment V1 is so selected that components disadvantageous in view of the following process step of the crushed or ground material are prevented from getting to the fractured surfaces, such that in said following process, step (b) is carried out in another environment V2 and said bond or compound formed between the fractured surfaces of material A and the molecules of the environment V1 is such that at least one molecule of the bond or compound is compatible with carrying out the further processing step of the crushed or ground material in said environment V2;

said method characterized in that the environment V1 contains propene, the environment V2 contains polypropylene plastic and the material A is talc.

2. A method for effecting a physico-chemical reaction in, and further processing, a crystalline or amorphous material A, the method comprising:

(a) crushing or grinding said material A thereby forming new fractured surfaces and, (b) subjecting the crushed or ground material to a following process step, said step (a) comprising grinding or crushing the material A in an environment V1 in order to provide the newly fractured surfaces with characteristics suitable for the following process step, whereby the physico-chemical property of said environment V1 is so selected that a bond or compound is formed between the fractured surfaces of material A and the molecules of the said environment V1, and the physico-chemical composition of said environment V1 is so selected that components disadvantageous in view of the following process step of the crushed or ground material are prevented from getting to the fractured surfaces;

wherein the material A is selected from the group consisting of stone, cement, talc and wollastonite; the material B is selected from the group consisting of asphalt, concrete, carbon dioxide, water and polystyrene; the environment V1 is selected from the group consisting of environments containing bitumen, water-cement paste, cement, propene, styrene and a combination of water and a filler.

3. The method according to claim 2 characterized in that the material A and the material B are crushed or ground together in environment V1, which is reactive with either the material A or the material B or reactive with both materials, wherein the environment V1 contains bitumen, the material A is of stone and the material B is of asphalt.

4. The method according to claim 2 characterized in that the material A and the material B are crushed or ground together in environment V1, which is reactive with either the material A or the material B or reactive with both materials, wherein the environment V1 is of water-cement paste, the material A is of stone and the material B is of concrete.

5. The method according to claim 2 characterized in that in step (a) the material A is ground in an environment containing substance C which is reactive with a substance D formed from the material A and the material B which is applied to the material A through a chemical reaction and said following process step (b) is carried out in another environment V2 and said bond or compound formed between the fractured surfaces of material A and the molecules of the environment V1 is such that at least one molecule of the bond or compound is compatible with carrying out the further processing step of the crushed or ground material in said environment V2, said method further characterized in that the bond or compound to be formed between the fractured surfaces of material A and the molecules of environment V1 is compatible with a material B present in the other environment V2 which material B is applied to the fractured surfaces of the crushed or ground material in the following process step, said material B acting as a matrix for the crushed or ground material A, wherein the environment V1 contains water and a filler, the material A is cement, the material B is water, the substance C is carbon dioxide and the material D is lime.

6. The method according to claim 2 characterized in that in step (a) the material A is ground in an environment containing substance C which is reactive with a substance D formed from the material A and the material B which is applied to the material A through a chemical reaction and said following process step (b) is carried out in another environment V2 and said bond or compound formed between the fractured surfaces of material A and the molecules of the environment V1 is such that at least one molecule of the bond or compound is compatible with carrying out the further processing step of the crushed or ground material in said environment V2, said method further characterized in that the bond or compound to be formed between the fractured surfaces of material A and the molecules of environment V1 is compatible with a material B present in the other environment V2 which material B is applied to the fractured surfaces of the crushed or ground material in the following process step said material B acting as a matrix for the crushed or ground material A, wherein the environment V1 contains water and a filler, the material A is cement, the material B is water, the substance C is carbon dioxide and the material D is lime.

7. The method according to claim 2 characterized in that the environment V1 or its component is so selected that the molecules thereof are bound to the material A and the material B with physical forces greater as compared with binding taking place when crushing and grinding material A in an air environment, wherein the environment V1 contains cement and the material A is stone.

8. The method according to claim 2 characterized in that the environment V1 contains styrene, the material A is wollastonite and the material B is polystyrene.

* * * * *